United States Patent [19]

Sinwald et al.

[11] Patent Number: 5,753,015
[45] Date of Patent: May 19, 1998

[54] SOYBEAN OIL MARKING COMPOSITIONS AND METHODS OF MAKING THE SAME

[75] Inventors: Thomas E. Sinwald, Sandusky; Michael J. Howick, Perrysburg, both of Ohio

[73] Assignee: Dixon Ticonderoga Company, Heathrow, Fla.

[21] Appl. No.: 749,645

[22] Filed: Nov. 15, 1996

[51] Int. Cl.$^6$ .................................................... C09D 11/00
[52] U.S. Cl. ................... 106/31.34; 106/31.35; 106/31.66; 106/31.67; 106/31.39; 106/31.71
[58] Field of Search ............... 106/19 B, 19 E, 106/27 R, 28 R, 31.34, 31.35, 31.66, 31.67, 31.39, 31.71

[56] References Cited

U.S. PATENT DOCUMENTS

| | | |
|---|---|---|
| 3,933,708 | 1/1976 | Brinkman . |
| 3,957,495 | 5/1976 | Teranishi et al. . |
| 5,039,243 | 8/1991 | O'Brien . |
| 5,261,952 | 11/1993 | Craig .................................. 106/19 B |
| 5,279,859 | 1/1994 | May . |
| 5,346,540 | 9/1994 | Schlennert . |
| 5,380,357 | 1/1995 | Lytton . |
| 5,383,954 | 1/1995 | Craig . |
| 5,417,746 | 5/1995 | Cheng . |

OTHER PUBLICATIONS

A. Willet, "Materials & Methods for Making Soybean Oil Crayons", Dec. 8, 1994.
A. Willet, "Making Soybean Oil Crayons", Apr. 26, 1995.

*Primary Examiner*—Deborah Jones
*Attorney, Agent, or Firm*—Fitzpatrick, Cella, Harper & Scinto

[57] ABSTRACT

The present invention is directed to a crayon marking composition comprising a fully hydrogenated soybean oil, a partially hydrogenated soybean oil, a fatty acid, a binder and a colorant, and methods of making the same.

22 Claims, No Drawings

SOYBEAN OIL MARKING COMPOSITIONS AND METHODS OF MAKING THE SAME

FIELD OF THE INVENTION

The present invention relates to soybean oil based solid marking compositions, writing instruments made of these solid marking compositions and methods for making both. In particular, the invention relates to commercially viable marking compositions, such as crayons, manufactured using soybean oil.

BACKGROUND OF THE INVENTION

It is known in the art that crayon marking compositions may be manufactured using mixtures of waxes, fatty acids, binders, pigment and other ingredients. Generally, the waxy material is a petroleum-based paraffin wax, microcrystalline wax or the like.

While these crayons are quite functional, petroleum-based waxes are derived from non-renewable sources.

Crayon manufacturers, therefore, have sought to use ingredients that are derived from renewable sources, thereby lessening their reliance on non-renewable oil. This is especially important since waxes are not a major by product of oil production, and at times they are in short supply. In addition, by using renewable sources crayon manufacturers appeal to customers who desire environmentally friendly products.

One potential renewable source for manufacturing crayons is soybean oil. Early attempts were made to manufacture crayons by replacing the traditional petroleum-based waxy material with fully and partially hydrogenated soybean oil. These early soybean oil crayons were an admixture of 43.5 to 45% by weight of fully hydrogenated soybean oil, 5% by weight of partially hydrogenated soybean oil, 34.5 to 35% by weight of stearic acid, 5% by weight of ethyl cellulose binder and 12 to 15% by weight of vegetable based pigment. The partially hydrogenated soybean oil used in those crayons had an iodine value of about 83.

These early soybean crayons, however, did not have the same performance characteristics as traditional commercial waxy crayons. Early soybean crayons were brittle and would frequently shatter into numerous pieces when dropped. In addition, when applied to paper these crayons mark, or lay down color, with difficulty. Poor lay down of color results in a less intense color, appearing dull, or washed out, when compared with the color provided using petroleum-based waxy crayons.

Moreover, early versions of soybean crayons could not be manufactured on a commercial scale. For example, since the melting point of these early soybean crayon mixtures was higher than traditional waxy crayons, if cooled using normal conditions for making crayons, the soybean crayon would wrinkle and/or would be weaker than the standard crayon.

The use of ethyl cellulose binder in the early soybean crayons presented difficulties because it thickened the marking composition to the extent that it affected the flow of the molten composition into the mold. As a result, soybean crayons made using ethyl cellulose could not be produced using standard production molds.

Also, because the fluid mixture for soybean crayons shrink less when cooled than waxy crayons, the early soybean crayon compositions were frequently damaged when removed from the mold. This was especially an issue when vegetable oil was used as the mold releasing agent. That is because the vegetable oil would become incorporated into the soybean crayon, and thus it could not act as a releasing agent to assist in removing the finished crayon from the mold.

BRIEF DESCRIPTION OF THE INVENTION

The present invention is directed to a novel marking composition that comprises a fully hydrogenated soybean oil, a partially hydrogenated soybean oil, a fatty acid and a binder. The composition may include additional ingredients such as a colorant.

The present invention is also directed to a method of manufacturing a novel composition comprising the steps of adding into a vessel a fully hydrogenated soybean oil, a partially hydrogenated soybean oil, a fatty acid and a binder. The vessel is heated until the contents are fluid, and the fluid mixture is poured into a mold lubricated with a releasing agent. The mold is cooled until the mixture becomes solid and the soybean oil marking compositions are released from the mold. In the present invention, the fluid mixture may additionally include, inter alia, a colorant, and the releasing agent may be a silicone-based composition.

An object of the invention is to overcome the deficiencies in prior soybean crayons.

Another object of the present invention is to provide a marking composition that is made from a renewable source, which has the same or relatively equivalent performance characteristics as those compositions derived from non-renewalable sources.

Still another object is to provide a method of making soybean oil crayons on a commercial scale.

The above, as well as other objects, of the present invention will become apparent from the accompanying description.

DETAILED DESCRIPTION OF THE INVENTION

The marking composition of the present invention comprises soybean oil as an ingredient, in particular mixtures of fully and partially hydrogenated soybean oil. Generally, soybean oil is a triglyceride having the following structure:

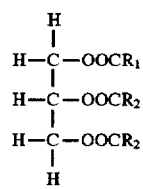

wherein $R_1$, $R_2$ or $R_3$ represent various types of fatty acids, which may be found in the soybean oil in different combinations. The predominate fatty acids in soybean oil have been identified as linoleic acid (43–56%) and linolenic acid (5–11%).

Whether the soybean oil is partially or fully hydrogenated depends on the type and ratio of fatty acids found in the soybean oil molecule. Saturated fatty acids are found in fully hydrogenated soybean oils, while both saturated and unsaturated fatty acids may be found in partially hydrogenated soybean oils.

The level of hydrogenation is measured in terms of the iodine value, referred to as "IV". Partially hydrogenated soybean oils possess a higher IV than fully hydrogenated soybean oils. In addition, partially hydrogenated soybean oils are more liquid at room temperature and less hydrogenated than fully hydrogenated soybean oils.

In the present invention, the fully hydrogenated soybean oils have an IV of about 5–10 and a melting point of about 65°–70° C. Partially hydrogenated soybean oils of the present invention have an IV of about 60 to 90, preferably 60 to 70, and are semi-solid at room temperature or slightly above room temperature. Examples of commercially available fully hydrogenated soybean oils useful in the present invention include "Soybean Oil Trite Flakes" sold by Anderson Clayton/Humko Products and "S8 Soybean Oil" available from Cargill. Examples of commercially available partially hydrogenated soybean oils are "S4–S7 Soybean Oil" from Cargill.

Any suitable amount of fully and partially hydrogenated soybean oil may be used. The preferred amount of fully hydrogenated soybean oil used in the present invention is from about 10 to 40%, more preferably about 20 to 35%. The preferred amount of partially hydrogenated soybean oil used in the present invention is from about 5 to 25% by weight, more preferably 10 to 15%.

Fatty acids are another ingredient used in manufacturing soybean crayons of the present invention. Fatty acids may include saturated fatty acids, unsaturated fatty acids or mixtures of both. Suitable fatty acids have about 12 to about 24 carbon atoms, examples of which include lauric acid, myristic acid, palmitic acid, pentadecanioic acid, margaric acid, oleic acid, stearic acid or mixtures of these acids.

Preferably the fatty acid used is commercially available stearic acid. Examples are flaked stearic acid such as "Industrene R" available from WITCO and "Emery 410 Stearic Acid" from Henkel. Any suitable amount of fatty acid may be used, however, preferably fatty acid is present in an amount of 10 to 60% by weight, most preferably 30 to 50%.

The present invention may also include a binder or filler in any suitable amount. Binders include talc, calcium carbonate, clay, kaolin clay, corn starch, mica, silica, alumina, or mixtures thereof. Preferably the binder is present in an amount of up to 30% by weight. More preferably the binder is talc in an amount of about 13 to 23% by weight. Commercially available talc which may be used as an ingredient in the present invention includes "NYTAL 400" from Vanderbilt Co.

Colorants, such as pigments or dyes, may also be found as an ingredient in the present invention. Standard dry pigment of any desired color or mixture of colors may be used. Inorganic pigments such as titanium dioxide, iron oxide, ultramarine blue, and aluminum flake may be used. Also, organic pigments such as azos, phthalos, diarylides, naphthols, carbon black and fluorescent pigments may be used. Examples of standard pigments include Diarylide Yellow Pigment, Diarylide Orange Pigment, Naphthol Red Pigment, PTMA Violet Pigment, Phthalo Blue Pigment, Phthalo Green Pigment, Carbon Black Pigment and Iron Oxide Pigment. In addition, commercially available phosphorescent pigments may be used to produce glow-in-the-dark crayons. Acidic or basic dyes may also be used, but pigments are the preferred colorant.

The amount of colorant present may be up to about 25% by weight depending on the colors used, and the intensity of color desired. Typically, the amount of colorant is about 1 to 5% by weight.

Other ingredients may also be included in the soybean crayons of the present invention. Examples of these include emollients, cleanability agents, glitter, or fragrances.

The marking compositions of the present invention may be prepared by placing in a suitable vessel, for example a heated kettle, the fully hydrogenated soybean oil, the partially hydrogenated soybean oil, the fatty acid, the binder and the colorant. These ingredients are heated to about 180° to 250° F. and stirred until they form a uniform fluid mixture.

Once the mixture is in a fluid state, it is poured into a mold which is lubricated with a release agent. The release agent may be silicone-based, a mineral oil, or other oils which do not become incorporated into the fluid mixture. Preferably the release agent is polydimethylsiloxane. Examples of release agents to be avoided are vegetable oils.

The mold is cooled until the mixture becomes solid, and then the solid composition is removed from the mold. The mold may be cooled by any suitable means depending on the equipment used. However, the preferred method is by cooling the mold with cooling water from about 75° to 95° F.

EXAMPLE 1

A soybean oil crayon is prepared using the following ingredients: about 25.7% by weight of fully hydrogenated soybean oil (S8), about 12.9% by weight of partially hydrogenated soybean (S7), about 38.6% by weight of stearic acid, about 18.5% by weight of talc and about 4.4% by weight of a mixture of iron oxide pigments resulting in a brown colorant.

EXAMPLES 2–8

Provided below are additional examples of soybean oil crayons prepared using the listed ingredients.

| Example | 2 | 3 | 4 | 5 | 6 | 7 | 8 |
|---|---|---|---|---|---|---|---|
| Component | | | | Amount (lbs.) | | | |
| S7 Fully Hydrogenated Soybean Oil | 12.5 | — | — | — | — | — | → |
| S8 Partially Hydrogenated Soybean Oil | 6.3 | — | — | — | — | — | → |
| Stearic Acid | 18.8 | — | — | — | — | — | → |
| Talc | 9.0 | — | — | — | — | — | → |
| Diarylide Yellow Pigment | 1.66 | | | | | | |
| Diarylide Orange Pigment | | 0.72 | | | | | |
| Naphthol Red Pigment | | | 1.63 | | | | |
| PTMA Violet Pigment | | | | 1.41 | | | |
| Phthalo Blue Pigment | | | | | 0.91 | | |
| Phthalo Green Pigment | | | | | | 0.94 | |
| Carbon Black Pigment | | | | | | | 1.6 |

While particular embodiments of soybean crayons and methods of making the same have been disclosed, it will be appreciated by those skilled in the art that modifications may be made without departing from the invention in its broader aspects and as set forth in the claims.

What is claimed is:

1. A marking composition comprising the admixture of:
   a. a fully hydrogenated soybean oil;
   b. a partially hydrogenated soybean oil;
   c. a fatty acid; and
   d. a binding agent selecting from the group talc, calcium carbonate, clay, kaolin clay, corn starch, mica, silica, alumina, and mixtures thereof.

2. A marking composition of claim 1, which further comprises a colorant for adding color to said marking composition.

3. A marking composition of claim 1, wherein said fatty acid comprises a stearic acid.

4. A marking composition comprising the admixture of:
   a. a fully hydrogenated soybean oil in an amount of about 10 to 40% by weight;

b. a partially hydrogenated soybean oil in an amount of about 5 to 25% by weight;

c. a fatty acid in an amount of about 10 to 60% by weight; and d. a binder in an amount up to about 30% by weight, wherein said binder is selected from the group consisting of talc, calcium carbonate, clay, kaolin clay, corn starch, mica, silica, alumina, and mixtures thereof.

5. A marking composition of claim 4, which further comprises a colorant in an amount up to about 25% by weight.

6. A marking composition of claim 4, wherein said fatty acid comprises a stearic acid.

7. A marking composition of claim 4, wherein said partially hydrogenated soybean oil has an iodine value of about 60 to 70.

8. A method of making a marking composition comprising the steps of:

a. adding into a vessel a fully hydrogenated soybean oil, a partially hydrogenated soybean oil, a fatty acid, and a binder;

b. heating said vessel until contents form a fluid mixture;

c. pouring said fluid mixture into a mold, said mold having been lubricated with a releasing agent;

d. cooling said mold until said fluid mixture forms a solid composition; and e. removing said solid composition from said mold.

9. A method of making a marking composition of claim 8, wherein said fatty acid comprises a stearic acid.

10. A method of making a marking composition of claim 8, wherein a. said fully hydrogenated soybean oil is used in an amount of about 15 to 40% by weight;

b. said partially hydrogenated soybean oil is used in an amount of about 5 to 25% by weight;

c. said fatty acid is used in an amount of about 10 to 60% by weight; and d. said binder is used in an amount up to about 30% by weight.

11. A method of making a marking composition of claim 8, wherein said fatty acid comprises a stearic acid.

12. A method of making a marking composition of claim 8, comprising the additional step of adding a colorant into said vessel.

13. A method of making a marking composition of claim 10, comprising the additional step of adding into said vessel a colorant in an amount up to about 25% by weight.

14. A method of making a marking composition of claim 10, wherein said releasing agent is a silicone-based agent.

15. A method of making a marking composition comprising the steps of:

a. adding into a vessel
 (i) a fully hydrogenated soybean oil in an amount of about 15 to 40% by weight;
 (ii) a partially hydrogenated soybean oil in an amount of about 5 to 25% by weight;
 (iii) a stearic acid in the an amount of about 10 to 60% by weight;
 (iv) a binder selected from the group consisting of talc, calcium carbonate, clay, kaolin clay, corn starch, mica, silica, alumina, and mixtures thereof in an amount up to about 30% by weight; and
 (v) a pigment in the amount up to about 25% by weight;

b. heating said vessel until the contents become a fluid mixture;

c. pouring said fluid mixture into a mold, said mold having been treated with a silicone-based releasing agent;

d. cooling said mold until said fluid mixture becomes a solid composition; and e. removing said solid composition from said mold.

16. A marking composition comprising the admixture of:

a. a hydrogenated soybean oil having an iodine value of about 15 to 70;

b. a fatty acid in an amount of about 10 to 60% by weight; and c. a binder in an amount up to about 30% by weight, wherein said binder is selected from the group consisting of talc, calcium carbonate, clay, kaolin clay, corn starch, mica, silica, alumina, and mixtures thereof.

17. A marking composition of claim 16, which further comprises a colorant in an amount up to about 25% by weight.

18. A method of making a marking composition comprising the steps of:

a. adding into a vessel a hydrogenated soybean oil having an iodine value of about 15 to 70, a fatty acid, and a binder;

b. heating said vessel until contents form a fluid mixture;

c. pouring said fluid mixture into a mold, said mold having been lubricated with a releasing agent;

d. cooling said mold until said fluid mixture forms a solid composition; and e. removing said solid composition from said mold.

19. A method of making a marking composition of claim 18, wherein a. said hydrogenated soybean oil is used in an amount of about 15 to 65% by weight;

b. said fatty acid is used in an amount of about 10 to 60% by weight; and c. said binder is used in an amount up to about 30% by weight.

20. A method of making a marking composition of claim 18, comprising the additional step of adding a colorant into said vessel.

21. A method of making a marking composition of claim 19, comprising the additional step of adding into said vessel a colorant in an amount up to about 25% by weight.

22. A method of making a marking composition comprising the steps of:

a. adding into a vessel
 (i) a hydrogenated soybean oil having an iodine value of about 20 to 30 in an amount of about 15 to 65% by weight;
 (ii) a stearic acid in the an amount of about 10 to 60% by weight;
 (iii) a binder selected from the group consisting of talc, calcium carbonate, clay, kaolin clay, corn starch, mica, silica, alumina, and mixtures thereof in an amount up to about 30% by weight; and
 (iv) a pigment in the amount up to about 25% by weight;

b. heating said vessel until the contents become a fluid mixture;

c. pouring said fluid mixture into a mold, said mold having been treated with a silicone-based releasing agent;

d. cooling said mold until said fluid mixture becomes a solid composition; and e. removing said solid composition from said mold.

* * * * *